United States Patent

[11] 3,576,952

[72] Inventor Hendrik Cornelis Anthony Van Duuren Wassenaar; Herman Da Silva, Voorburg, Netherlands

[21] Appl. No. 789,340
[22] Filed Jan. 6, 1969
[45] Patented May 4, 1971
[73] Assignees De Staat Der Nederlanden Ten Deze Vertegenwoordigd Door De Directeur, The Hague, Netherlands
[32] Priority Jan. 19, 1968
[33] Netherlands
[31] 6800871

[54] FORWARD ERROR CORRECTING CODE TELECOMMUNICATING SYSTEM
11 Claims, 4 Drawing Figs.

[52] U.S. Cl. ........ 178/23.1, 235/153
[51] Int. Cl. ........ H04l 1/10
[50] Field of Search ........ 340/146.1; 178/23.1; 235/153

*Primary Examiner*—Kathleen H. Claffy
*Assistant Examiner*—Thomas D'Amico
*Attorney*—Hugh Adam Kirk

ABSTRACT: A multielement code telecommunication system comprising first converting each code signal into a constant ratio 1-bit/0-bit signal, storing a predetermined successive number of such converted code signals in shift registers to form a group, and forming a test signal by modulo 2 adding the bits in said group of signals which test signal is transmitted with and after each said group to form a block of signals; receiving and storing in shift registers each signal in said group, testing each signal as it is received and if one and only one signal in said group is found mutilated or erroneous, clearing the shift register in which that erroneous signal is stored and reconstructing therein the correct signal from said test signal and the other correctly received signals in that group; and lastly reconverting said correct group of signals and transferring them from printing registers successively to a printer.

PATENTED MAY 4 1971

3,576,952

INVENTORS
H. C. A. VAN DUUREN
H. DA SILVA

BY Hugh A. Kirk

ATTORNEY

INVENTORS
H. C. A. VAN DUUREN
H. DA SILVA
BY
ATTORNEY

FORWARD ERROR CORRECTING CODE TELECOMMUNICATING SYSTEM

RELATED APPLICATIONS

Priority Netherlands application Ser. No. 6800871, filed Jan. 19, 1968.

BACKGROUND OF THE INVENTION

It is general knowledge that to convert information signals, such as telegraph signals, before they are transmitted into binary code signals having a constant mark/space ratio (0-bit/1-bit ratio), the signals are provided with a certain amount of redundancy at the transmitting end. At the receiving end each signal is tested for this mark/space ratio in an error detector. If the test gives a positive result the relevant signal is printed. If the result is negative, repetition is requested until the relevant signal is found correct. This working method has the disadvantage that every request for repetition as well as the repetition itself amount to loss of time and that on the transmission path fresh errors may be introduced. In this system correction requires repetition. In order to avoid or to limit such repetition, other known systems have been developed, in which, at the transmitting end, the signals are provided with so much redundancy that the receiving station can effect the correction itself.

SUMMARY OF THE INVENTION

The system according to this invention is of the latter type. It is so arranged that at the transmitting end the information signals are built up or converted into constant ratio 1-bit/0-bit signals so as to allow a test of the correctness of each of these signals by means of an error detector. Then a test signal which is obtained by modulo 2 adding (bit by bit) these converted information signals of the relevant block (starting with the first bits and finishing up with the last) is sent along with the block. These blocks are then transmitted and at the receiving end all the information signals contained in each block are first tested for correctness and if they are found correct, they are printed. However, if not more than one information signal in a block is found incorrect, all the bits belonging to this incorrect signal which are stored in a register are given the 0-valve. Then all the other and correctly received signals of the block and the test signal received are passed through a modulo 2 adder and the resulting sum formed represents the signal found incorrect in corrected form.

Thus with N signals, of which the correctness of each can be checked on reception, a test signal containing the modulo 2 sum of all the N information signals is also transmitted to form the block. The first bit of this test signal is the modulo 2 sum of all the N first bits, the second bit of the test signal being the modulo 2 sum of all the N second bits, etc.

If now in a block of a series of N information signals and a test signal, one information signal is received mutilated, this one signal can be found back by determining the modulo 2 sum of all the other information signals and the test signal, if the signal information originally found incorrect has been omitted or neglected. Thus according to this invention, if the incorrect signal is given the 0-value, the bits of the incorrect signal can be reconstructed or determined bit by bit by the modulo 2 addition of all the other bits in the block.

The system is based on the following rules:

Let the modulo 2 sum of two signals A and B be equal to C. Then:

$A \oplus B = C$, but also, in this method of calculation, $A \oplus C = B$ and $A \oplus 0 = A$, from which results that $A \oplus 0 \oplus C = B$.

If B is the mutilated information signal, the signal B is given the 0-value. The modulo 2 addition of A, 0 and C will result in the combination B, which was the original information of the second signal.

BRIEF DESCRIPTION OF THE VIEWS

The above-mentioned and other features, objects, and advantages, and a manner of attaining them are described more specifically below by reference to an embodiment of this invention shown in the accompanying drawings, wherein:

FIG. 1 is a schematic block wiring diagram of one embodiment of the circuit of this invention at a transmitter station for a group of two intelligent multielement code signals plus a test signal to form a block;

FIG. 1*a* is a schematic pulse wave time diagram for the control pulses for the operation of the circuit in FIG. 1 for the transmission of two successive blocks of signals;

FIG. 2 is a schematic block wiring diagram of the circuit of this invention at a receiver station for receiving the blocks of signals from the transmitter circuit of FIG. 1; and FIG. 2*a* is a schematic pulse wave time diagram for the control pulses for the operation of the circuit in FIG. 2.

DETAILED DESCRIPTION OF A PREFERRED EMBODIMENT

I TRANSMITTER

Figure 1:
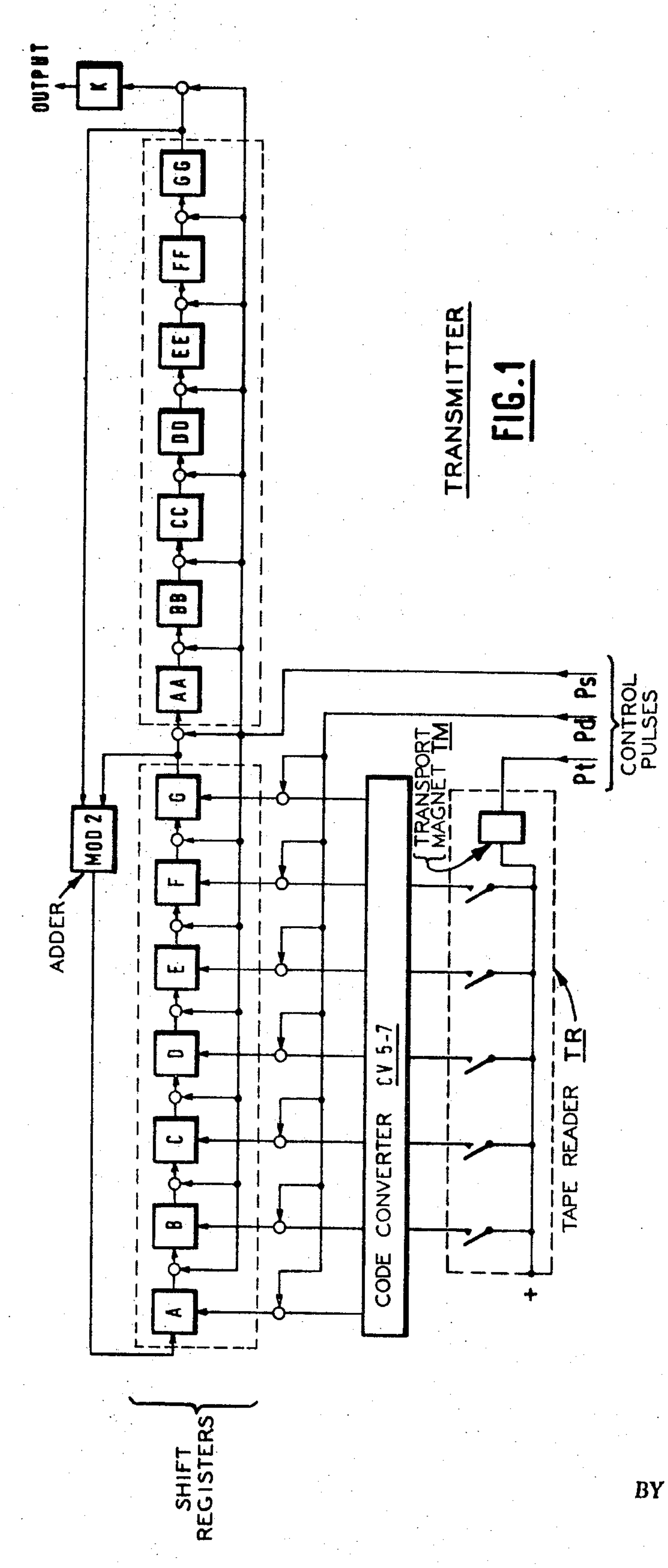
Figure 1A:
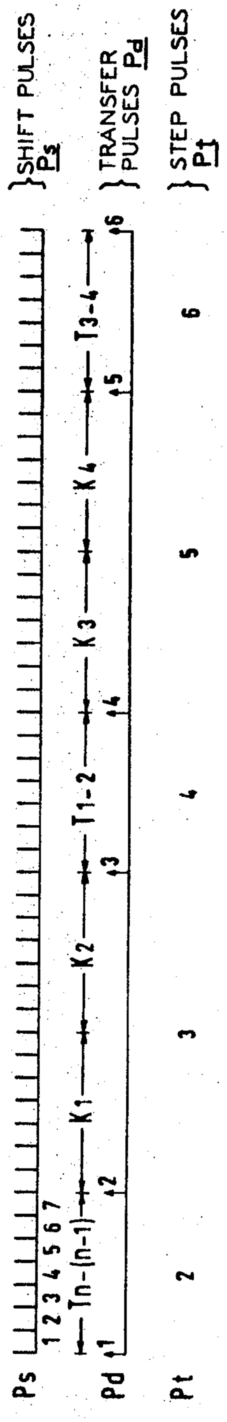

First, reference will be had to the transmitter circuit shown in FIG. 1 and its associated time diagram in FIG. 1*a* which indicates the times at which the controlling pulses Ps, Pd and Pt for the transmitter appear. In this example N, the number of intelligence signals per block or group, has been taken equal two.

At every Pt pulse the perforated tape in the tape reader TR is advanced by one character by the transport magnet TM. In the code converter CV5–7 the character read is converted into a 7-bit constant-ratio code signal. Under the control of the Pd pulses the output of the code converter CV5–7 is transferred to the flip-flops A through G of a first shift register A through G. The Ps pulses shift this information to the second shift register AA through GG, where the complete signal has become recorded after seven shift pulses Ps. The outputs of the flip-flops G and GG is modulo 2 added in adder MOD2, the result being recorded in the flip-flop A.

Thus pulse Pd1 records the character K1 in the register A through G. After seven Ps pulses this character has shifted to the register AA—GG. At that moment the register A—G contains the modulo 2 sum of K1 and the former contents of register AA—GG. Then, however, the information of K2 is substituted for the contents of the register A—G by the pulse Pd2. After another seven shift pulses Ps the information of K1 has past bit by bit via the keying flip-flop K for transmission. At that moment the flip-flops or register AA—GG contain the information K2 and the flip-flops or register A—G contain the modulo 2 sum of K1 and K2. (T1–2). However, after these seven Ps pulses no Pd pulse appears, the modulo 2 sum is not wiped out, but shifted on to the flip-flops AA—GG. After another seven Ps pulses this sum (T1–2) has shifted into the register AA—GG and the contents of register AA—GG, being the information K2, have been transmitted via keyer K. At that moment the flip-flops A—G contain the modulo 2 sum of K2 and T1–2. This information is wiped out now and replaced by the K3 information under the control of the pulse Pd3.

The next seven Ps pulses shift the K3 information on to the flip-flops AA—GG and the modulo 2 sum of K1 and K2 (T1–2) is transmitted by keyer K.

The pulse Pd4 introduces K4 into the register A—G, the modulo 2 sum of K3 and T1–2 still present in this register being wiped out.

Thus every two signals transmitted from the code converter are followed by their modulo 2 sum.

II RECEIVER

Figures 2, 2A:
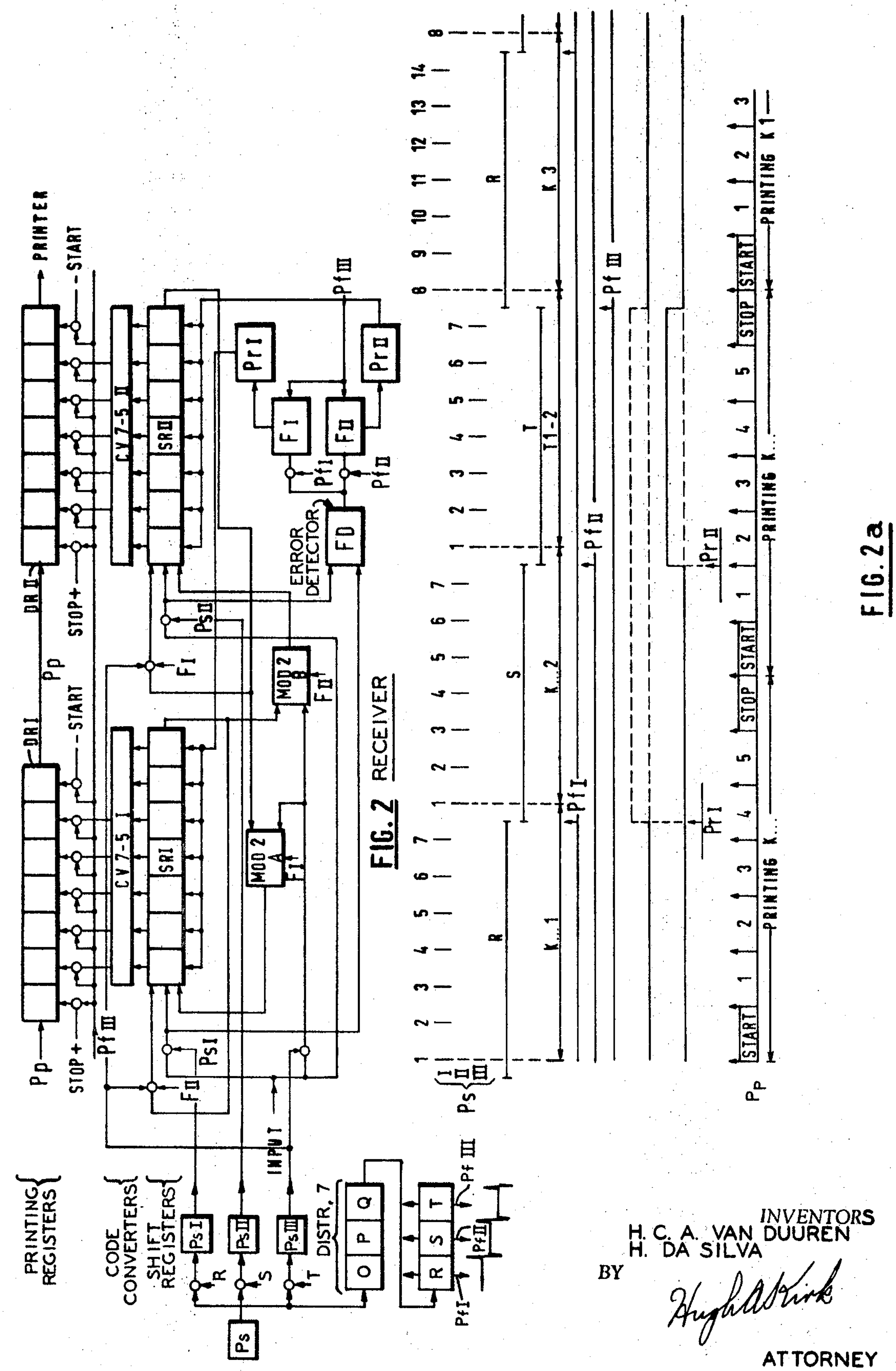

FIG. 2 is an example of a block diagram of a receiver according to the system of the invention. The associated time diagram FIG. 2*a* indicates the times at which the control pulses for the receiver appear.

The signal received is rectified and applied to the receiver shift registers SRI and SRII, the first seven bits being shifted by PsI pulses into SRI. The flip-flops R, S and T divide the Ps pulses into series of seven PsI, seven PsII and seven PsIII pulses, the sevenfold distributor OPQ also delivering one pulse PfI, PfII and PfIII at each transition of RST after every seven Ps pulses, thus securing the selecting possiblity.

After the first seven Ps pulses (PsI) the first signal received (K1) has become recorded in the register SRI. In the meantime the error detector FD has tested the signal for the correct number of 1-bits. If this number is not correct, error detector FD gives the error criterion, thus causing the flip-flop FI to take the 1-state under the control of the PfI pulse from the distribution RST. During the PSII pulses the next signal is recorded in SRII, the number of 1-bits of it being counted in error detector FD. If a deviation from the correct number of 1-bits is found, the error criterion from error detector FD causes the flip-flop FII to take the 1-state under the control of the pulse PfII.

This error correcting system is based on the demand that of all the information signals and the accompanying test signal, only one signal may be mutilated.

Let now the first signal (K1) be received mutilated. Then after the PfI pulse the flip-flop FI is in the 1-state. This causes the generation of a PrI pulse, which wipes out all the information stored in shift register SRI, putting all the SRI flip-flops in the zero state. The second signal (K2) is recorded correctly in SRII, after which the test signal comes in under the control of the PsIII pulses. As flip-flop FI is in the 1-state, the SRI register will record the modulo 2 sum of the arriving test signal (T1–2) and the correct second information signal K2 stored in shift register SRII via modulo 2 adder MOD–2–A. At the same time, under the control of the PsIII pulses the information signal (K2) shifted out of the SRII register is introduced into it again, as conditioned by the 1-state of FI. Thus after seven PsIII pulses the first shift register SRI contains the modulo 2 sum of the test signal T1–2 and the second information signal K2 which sum equals the correct first signal K1 and the second shift register. SRII contains the information of the second signal K2 which has been restored in it again.

The PfIII pulse following then resets the flip-flop FI to the 0-state and effects the code conversion of the signals K1 and K2 now contained in the registers SRI and SRII by means of the code converters CV7–5(I) and CV7–5(II). The resulting 5-bit signals K1 and K2 are recorded in the printing registers DRI and DRII, of which the first register elements are put in the start polarity state and the last register elements in the stop polarity state. The bits 1 to 5 of the two converted signals are stored in the register elements 2 to 6 of these two registers DRI and DRII. Under the control of the pulses Pp these 5-bit characters, provided with start and stop bits, are shifted out to the printer.

An analogous procedure takes place, if the second signal is mutilated, whereas the first signal and the test signal have been received correctly. In that case the flip-flop FII is put in the 1-state by the PfII pulse, a PrII pulse, generated in consequence, wiping out the contents of the second shift register SRII, putting all of this SRII register elements in the 0-state. As conditioned by flip-flop FII in the 1-state and under the control of PsIII pulses the modulo 2 sum of the first signal K1 and the test signal T1–2 is recorded in the second shift register SRII via modulo 2 adder MOD–2–B, and the correct information signal K1 shifted out from the first shift register PRI is recorded afresh in it. So after the seven PsIII pulses, the first shift register SRI contains the original information signal K1 again, and the second shift register SRII contains the modulo 2 sum of K1 and the test signal, T1–2 which equals the reformed or correct information signal K2. If both information signals K1 and K2 have been received correctly, the flip-flop FI as well as flip-flop FII remains in the b 0-state. In that case no modulo 2 addition is carried out, and the modulo 2 signal T1–2 will not be used, nor will the information signals K1 and K2 that are recorded in the registers SRI and SRII be shifted on. So during the PsIII pulses the recorded information signals (K1) and (K2) remain unchanged, and after the seven PsIII pulses these K1 and K2 signals are printed in the manner described above.

While there is described above the principles of this invention in connection with specific apparatus, it is to be clearly understood that this description is made only by way of example and not as a limitation to the scope of this invention.

We claim:

1. A telecommunication system for blocks of multielement code signals having a transmitter and a receiver for said signals, said transmitter comprising:

A. means to convert said signals into constant/ratio code signals,

B. means connected to said converter means for storing a group of successive converted code signals in a first shift register, C. a modulo 2 adder means connected to said storing means for forming a test signal by successively adding the last elements of said plurality of successively stored code signals in said group, and D. means connected to said storing means for transmitting said group of code signals followed by said test signal to form a block; and said receiver comprising:

E. means connected to said receiving means for successively testing each code signal in said group for errors, F. means connected to said receiving means for storing said code signals in a second shift register, and G. separate modulo 2 adder means for each code signal in said group and connected to said receiving means and to the latter storing means for each said code signal for reconstructing one erroneously detected signal in said second shift register from the other and correctly received code signals and said test signal in said block by successively adding the elements of said other code and test signals.

2. A system according to claim 1 including a tape reader at said transmitter for introducing said multielement code signals to said converter means.

3. A system according to claim 1 wherein said modulo 2 adder means are connected to the outputs of said shift registers corresponding to each code signal of said group of code signals stored therein.

4. A system according to claim 1 wherein said test signal forming means in said transmitter comprises means for cancelling each added signal from said first shift register except that for said test signal.

5. A system according to claim 1 wherein said transmitting means includes a keyer.

6. A system according to claim 1 wherein said transmitter includes means for applying a plurality of timed pulses for controlling said means A through D of said transmitter.

7. A system according to claim 1 wherein said elements of said signals comprise b 1-bits and 0-bits and said means for reconstructing one erroneously detected code signal in said receiver comprises means for converting the elements of that erroneously detected code signal to 0-bits in its corresponding portion of said second shift register.

8. A system according to claim 1 wherein said receiver includes a distributor for producing pulses for controlling said means E through H in said receiver.

9. A system according to claim 1 including a code converter connected to said storing means in said receiver for converting said code signals.

10. A system according to claim 9 including another register means in said receiver for said converted code signals in said group.

11. A system according to claim 10 including a printer means connected to said other register means for the correct code signals in said group.

PO-1050
(5/69)

UNITED STATES PATENT OFFICE
CERTIFICATE OF CORRECTION

Patent No. 3,576,952 Dated May 4, 1971

Inventor(s) H. C. A. Van Duuren and Herman Da Silva

It is certified that error appears in the above-identified patent and that said Letters Patent are hereby corrected as shown below:

Column 1, line 44, "O-valve" should read -- O-value -- ; Column line 3, before "SRI" insert -- register -- , line 14, "tribution" shou read -- tributor -- , line 61, after "pulses" insert a comma -- , - line 68, after "signal" delete the comma "," ; line 71, before "O-state" delete the "b" ; Column 4, line 56, before "1-bits" delete the "b".

Signed and sealed this 9th day of November 1971.

(SEAL)
Attest:

EDWARD M.FLETCHER,JR.
Attesting Officer

ROBERT GOTTSCHALK
Acting Commissioner of Pater